United States Patent
Deguchi et al.

(10) Patent No.: US 12,258,088 B2
(45) Date of Patent: Mar. 25, 2025

(54) STRADDLE-TYPE VEHICLE

(71) Applicant: SUZUKI MOTOR CORPORATION, Hamamatsu (JP)

(72) Inventors: Akihito Deguchi, Hamamatsu (JP); Makoto Satou, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 337 days.

(21) Appl. No.: 17/991,335

(22) Filed: Nov. 21, 2022

(65) Prior Publication Data
US 2023/0192213 A1 Jun. 22, 2023

(30) Foreign Application Priority Data

Dec. 17, 2021 (JP) .................................. 2021-204902

(51) Int. Cl.
*B62J 15/02* (2006.01)
*B62K 21/02* (2006.01)

(52) U.S. Cl.
CPC ............... *B62J 15/02* (2013.01); *B62K 21/02* (2013.01)

(58) Field of Classification Search
CPC ................................. B62J 15/02; B62K 21/02
See application file for complete search history.

(56) References Cited

U.S. PATENT DOCUMENTS

| 4,878,558 | A * | 11/1989 | Asakura | B62K 25/005 188/344 |
| 5,026,083 | A * | 6/1991 | Wendorf | B62K 25/16 280/157 |
| 6,257,362 | B1 * | 7/2001 | Scherbarth | B62J 15/02 280/288.4 |
| 2004/0212169 | A1 * | 10/2004 | Takemura | B62J 15/02 280/152.1 |

(Continued)

FOREIGN PATENT DOCUMENTS

| CN | 203511915 U | * | 4/2014 |
| DE | 10 2019 125 198 A1 | | 4/2020 |

(Continued)

OTHER PUBLICATIONS

German Office Action dated Oct. 4, 2023, issued by the German Patent and Trademark Office in corresponding application DE 102022131252.6.

*Primary Examiner* — Erez Gurari
(74) *Attorney, Agent, or Firm* — Stein IP, LLC

(57) ABSTRACT

There is provided a straddle-type vehicle including: a head pipe; a steering stem rotatably supported in the head pipe; a front fork; an upper bracket connecting an upper end portion of the front fork to the steering stem; a lower bracket located below the upper bracket and connecting an upper portion of the front fork to the steering stem; a front wheel supported by a lower end portion of the front fork; a front fender covering the front wheel from above; a front cowl covering an upper front portion of the straddle-type vehicle; a shroud (Continued)

located above the front fender and covering a lower portion of the front cowl; and a lower bracket cover located above the front fender and covering the lower bracket from below. The shroud has an opening through which the front fork passes. The lower bracket cover is provided below the opening.

6 Claims, 8 Drawing Sheets

(56) References Cited

U.S. PATENT DOCUMENTS

| | | | |
|---|---|---|---|
| 2009/0058066 A1* | 3/2009 | Adachi | B62J 15/02 |
| | | | 280/160 |
| 2013/0223924 A1* | 8/2013 | Syu | B62J 15/02 |
| | | | 403/321 |
| 2014/0183836 A1* | 7/2014 | Ishii | B62K 21/02 |
| | | | 280/267 |
| 2015/0042062 A1* | 2/2015 | Takatsuka | B62J 45/423 |
| | | | 280/264 |
| 2016/0264199 A1* | 9/2016 | Wakita | B62J 15/00 |
| 2016/0288852 A1* | 10/2016 | Nishimoto | B62J 6/04 |
| 2017/0320531 A1* | 11/2017 | Serotta | B62J 15/02 |
| 2023/0140031 A1* | 5/2023 | Watanabe | B60C 11/243 |
| | | | 73/146 |
| 2023/0192213 A1* | 6/2023 | Deguchi | B62J 17/10 |
| | | | 280/154 |

FOREIGN PATENT DOCUMENTS

| | | |
|---|---|---|
| EP | 0 751 288 A1 | 6/1996 |
| JP | 2005-254873 A | 9/2005 |

* cited by examiner

STRADDLE-TYPE VEHICLE

CROSS-REFERENCE TO RELATED APPLICATIONS

This application is based on Japanese Patent Application No. 2021-204902 filed on Dec. 17, 2021, the contents of which are incorporated herein by way of reference.

TECHNICAL FIELD

The present invention relates to a straddle-type vehicle including a front cowl.

BACKGROUND

In a straddle-type vehicle, a front cowl has a function of reducing air resistance during traveling, a function of reducing a lift generated during traveling, a function of reducing traveling wind blowing against a driver, and the like. The front cowl includes a cowl that covers only a periphery of a headlamp, a cowl that covers the periphery of the headlamp to a front side of a fuel tank, a cowl that covers the periphery of the headlamp to an upper side of a radiator or a side of a cylinder head of an engine, and the like. A front upper part of a full cowl also corresponds to the front cowl.

When the straddle-type vehicle including the front cowl travels, the traveling wind passes between the front cowl and a front fender, and blows against the radiator or an oil cooler (or the engine in a case of an air-cooled engine) provided behind a front wheel. The radiator or the oil cooler (or the engine) is cooled by the traveling wind.

However, in general, a lower portion of the front cowl is formed with a space for a front fork to pass therethrough. In particular, in a straddle-type vehicle of a type in which a front cowl is supported by a main frame or the like of the straddle-type vehicle, a large space is secured in a lower portion of the front cowl in order to enable the front fork to rotate relative to the front cowl with a steering stem as a rotation shaft. Specifically, the front fork is supported by the steering stem via an upper bracket and a lower bracket, but a portion located generally below the lower bracket is not covered with the cowl. In the related-art straddle-type vehicle of such a type, a part of the traveling wind may enter an inside of the front cowl through the space in the lower portion of the front cowl, and may flow inside the front cowl in an upward direction or an upper rear direction. As a result, an amount of the traveling wind that blows against the radiator, the oil cooler, or the engine is reduced, and a cooling effect for the radiator, the oil cooler, or the engine is lowered. The traveling wind passing through the space in the lower portion of the front cowl and flowing inside the front cowl in the upward direction or the upper rear direction may blow against a frame or the like of the straddle-type vehicle, which increases air resistance or generates a front lift.

A motorcycle shown in FIG. 2 of Patent Literature 1 described below includes a front cover portion (20) that covers the front of a front fork (2) and a head pipe (3). The front cover portion (20) is supported by the head pipe (3) and a main frame (5) by stays (21, 22). An under cover portion (25) is provided below a nose (24) located at the front of the front cover portion (20). The under cover portion (25) faces a front fender (13), extends substantially horizontally rearward above the front fender (13), and reaches the vicinity of the front fork (2). A gap through which the front fork (2) passes is formed behind the under cover portion (25). The front fork (2) is connected to a steering shaft (29) by a top bridge (27) and a bottom bridge (28). A baffle plate (30) is attached to the bottom bridge (28). A front portion (31) of the baffle plate (30) overlaps with an upper portion of the under cover portion (25), and an intermediate portion (32) of the baffle plate (30) abuts against a lower surface of the bottom bridge (28). A rear portion (33) of the baffle plate (30) extends upward along a back surface of the bottom bridge (28), is bent substantially horizontally rearward near a lower surface of the main frame 5, extends to an upper portion of the radiator (15), and covers a part of the radiator (15) above. Paragraph 0036 of Patent Literature 1 discloses that the baffle plate (30) has a function of suppressing the traveling wind from entering an inside of the front cover portion (20) through the gap through which the front fork (2) passes. The above-described reference numerals with parentheses are the reference numerals described in Patent Literature 1.

Patent Literature 1: JP2005-254873A

According to the description of Patent Literature 1 described above, it is considered that the baffle plate (30) in Patent Literature 1 can have the effect of suppressing the traveling wind entering the inside of the front cowl portion (20) through the gap through which the front fork (2) passes.

However, the baffle plate (30) is attached to the bottom bridge (28) connecting the front fork (2) to the steering shaft (29), and is provided between the bottom bridge (28) and the under cover portion (25). Therefore, when a distance between the bottom bridge (28) and the under cover portion (25) in the upper-lower direction is large due to, for example, design of the vehicle, a gap between the baffle plate (30) and the under cover portion (25) in an upper-lower direction becomes large accordingly. As a result, the traveling wind is likely to enter the inside of the front cowl portion (20) through the gap between the baffle plate (30) and the under cover portion (25), and the above-described effect of the baffle plate (30) may not be sufficiently attained.

On the other hand, when the distance between the bottom bridge (28) and the under cover portion (25) in the upper-lower direction is extremely small due to the design of the vehicle or the like, it is difficult to secure a space for disposing the baffle plate (30) between the bottom bridge (28) and the under cover portion (25). In this case, the baffle plate (30) cannot be provided.

The present invention has been made in view of the above-described problems, for example, and an object of the present invention is to provide a straddle-type vehicle capable of suppressing traveling wind entering an inside of a front cowl through a space through which a front fork passes, improving an aerodynamic performance of the straddle-type vehicle, or increasing an amount of traveling wind blowing against a radiator, an oil cooler, or the like.

SUMMARY

In order to solve the above problem, there is provided a straddle-type vehicle including: a head pipe; a steering stem rotatably supported in the head pipe; a front fork; an upper bracket connecting an upper end portion of the front fork to the steering stem; a lower bracket located below the upper bracket and connecting an upper portion of the front fork to the steering stem; a front wheel supported by a lower end portion of the front fork; a front fender covering the front wheel from above; a front cowl covering an upper front portion of the straddle-type vehicle; a shroud located above the front fender and covering a lower portion of the front cowl; and a lower bracket cover located above the front fender and covering the lower bracket from below. The shroud has an opening through which the front fork passes. The lower bracket cover is provided below the opening.

BRIEF DESCRIPTION OF DRAWINGS

FIGS. 5A to 5C are explanatory views showing a shroud in the straddle-type vehicle according to the embodiment of the present invention, in which FIG. 5A shows a state where the shroud is viewed from the front, FIG. 5B shows a cross section of the shroud cut along a cutting line V-V in FIG. 5A, and FIG. 5C shows a state where the shroud is viewed from below;

FIGS. 6A to 6D are explanatory views showing a lower bracket cover of the straddle-type vehicle according to the embodiment of the present invention, in which FIG. 6A shows a state where the lower bracket cover is viewed from the front, FIG. 6B shows a cross section of the lower bracket cover cut along a cutting line VI-VI in FIG. 6A, FIG. 6C shows a state where the lower bracket cover is viewed from above, and FIG. 6D shows a state where the lower bracket cover is disassembled;

FIGS. 8A and 8B are explanatory views showing the shroud and the lower bracket cover in the straddle-type vehicle according to the embodiment of the present invention, in which FIG. 8A shows a state where the shroud and the lower bracket cover are viewed from above, and FIG. 8B shows a state where the shroud and the lower bracket cover are viewed from below.

DESCRIPTION OF EMBODIMENTS

Figure 1:
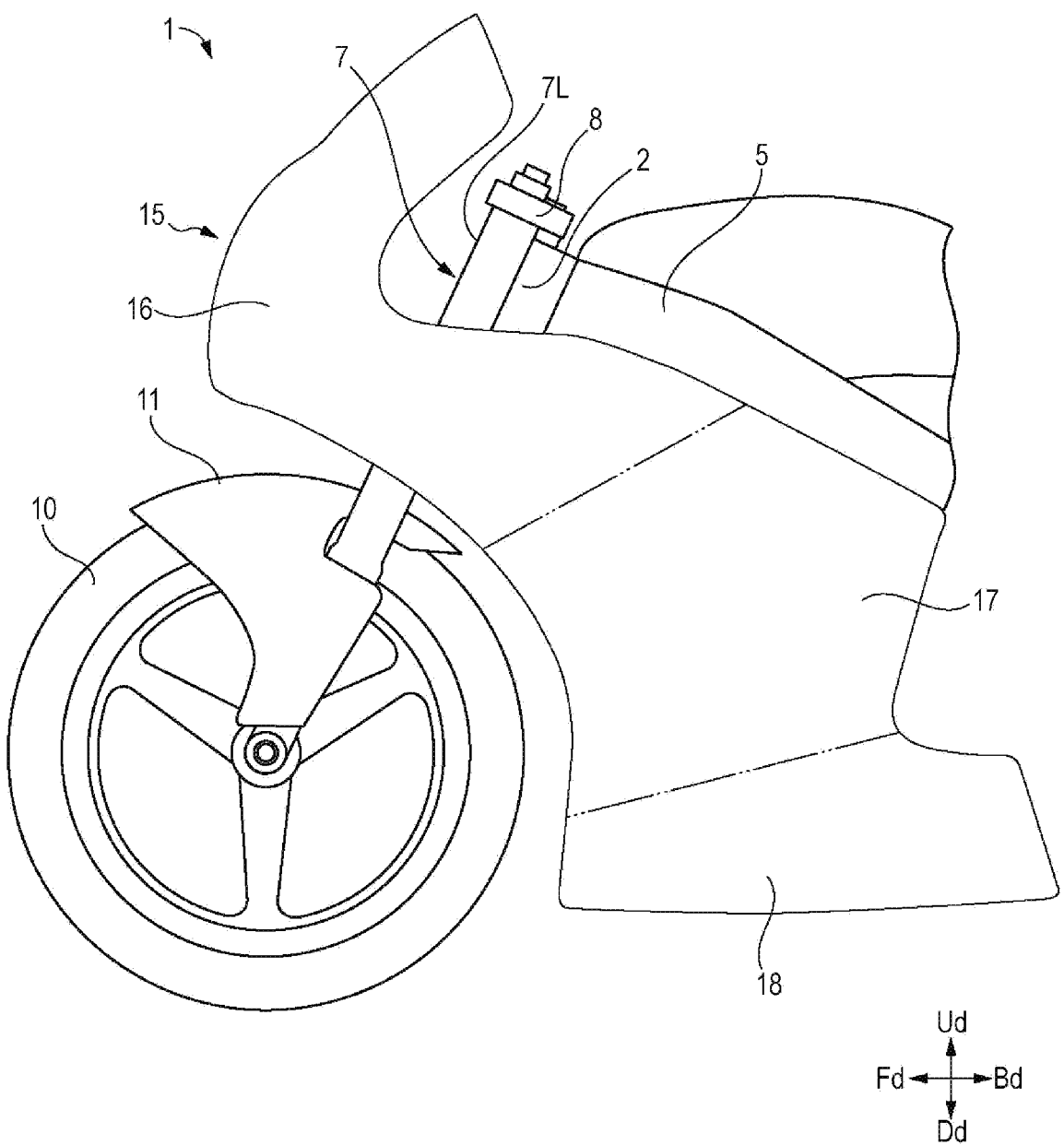
FIG. 1 is an explanatory view showing a state where a front portion of a straddle-type vehicle according to an embodiment of the present invention is viewed from the left.

A straddle-type vehicle according to an embodiment of the present invention includes a head pipe, a steering stem rotatably supported in the head pipe, a front fork, an upper bracket connecting an upper end portion of the front fork to the steering stem, a lower bracket located below the upper bracket and connecting an upper portion of the front fork to the steering stem, a front wheel supported by a lower end portion of the front fork, and a front fender covering the front wheel from above. Further, the straddle-type vehicle according to the embodiment of the present invention includes a front cowl covering an upper front portion of the straddle-type vehicle, a shroud located above the front fender and covering a lower portion of the front cowl, and a lower bracket cover located above the front fender and covering the lower bracket from below. The shroud has an opening through which the front fork passes, and the lower bracket cover is provided below the opening.

In the straddle-type vehicle according to the present embodiment, the lower bracket cover covering the lower bracket from below is provided below the opening through which the front fork passes in the shroud. Therefore, the opening of the shroud can be covered with the lower bracket cover from below. Accordingly, it is possible to suppress traveling wind passing between the shroud and the front fender during traveling of the straddle-type vehicle from entering an inside of the front cowl through the opening of the shroud. Therefore, it is possible to suppress an increase in air resistance or generation of a front lift caused by the traveling wind entering the inside of the front cowl through the opening, and thus it is possible to improve an aerodynamic performance of the straddle-type vehicle. Further, it is possible to increase an amount of the traveling wind blowing against a radiator or the like, and it is possible to improve a cooling effect for the radiator or the like.

In the straddle-type vehicle according to the present embodiment, since the lower bracket cover is provided below the opening of the shroud, even when a distance between the lower bracket and the shroud in an upper-lower direction is increased due to design of the straddle-type vehicle or the like, the lower bracket cover can be provided below the opening of the shroud in a state where the lower bracket cover is brought close to the shroud, and the opening can be reliably covered by the lower bracket cover. Therefore, an effect of the lower bracket cover of suppressing the traveling wind from entering the inside of the front cowl through the opening can be suppressed from being lowered due to an increase in the distance between the lower bracket and the shroud in the upper-lower direction due to the design of the straddle-type vehicle or the like. Since the lower bracket cover is provided below the opening of the shroud, even when the distance between the lower bracket and the shroud in the upper-lower direction is extremely small due to the design of the straddle-type vehicle or the like, the lower bracket cover can be provided below the opening of the shroud, and the opening can be covered by the lower bracket cover.

Embodiment

The embodiment of the straddle-type vehicle according to the present invention will be described with reference to FIGS. 1 to 8B. In the embodiment, directions of the front (Fd), the rear (Bd), the upper (Ud), the lower (Dd), the left (Ld), and the right (Rd) are described according to arrows drawn at the lower right of the drawings.

(Straddle-Type Vehicle)

Figure 2:
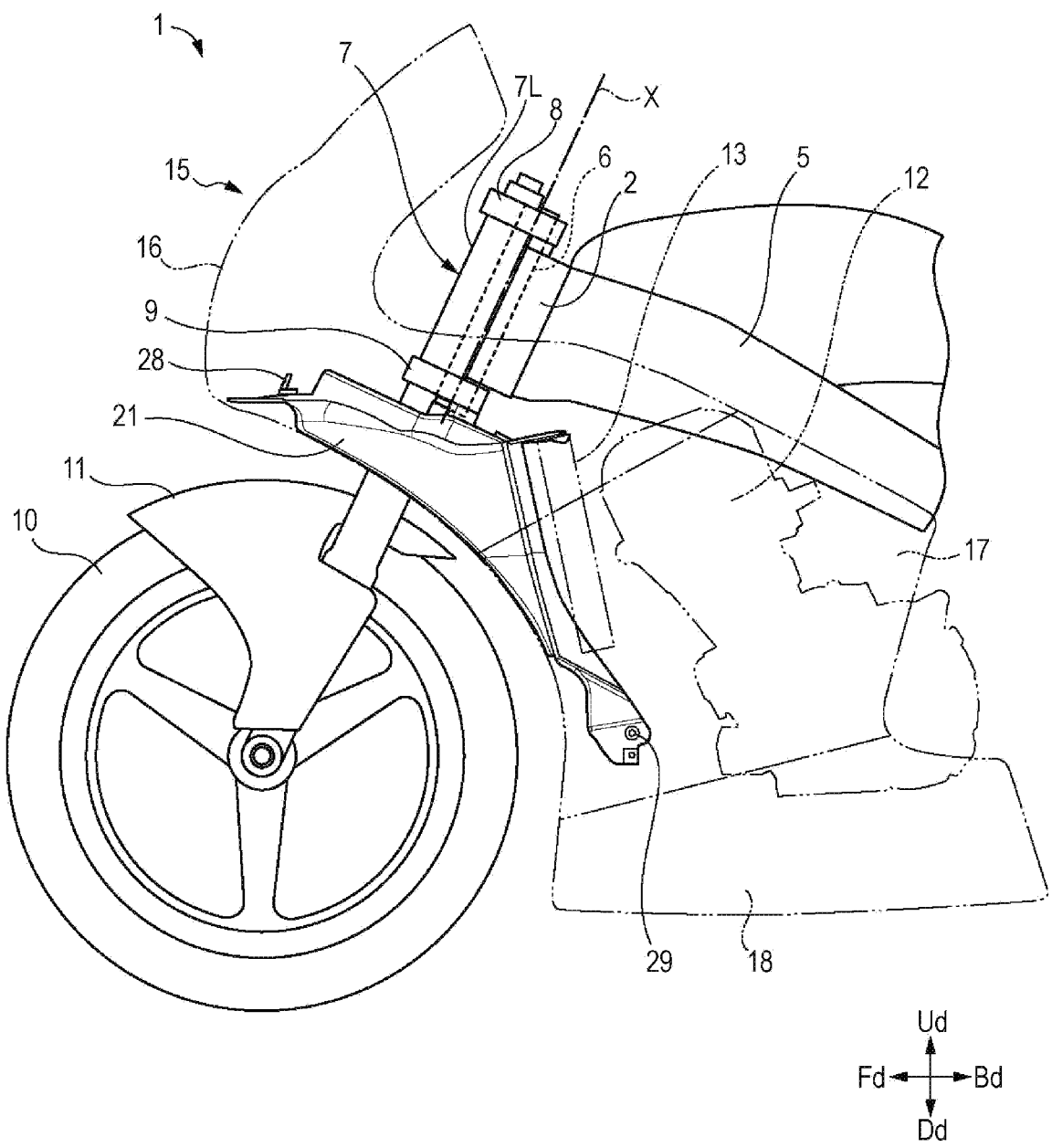
FIG. 2 is an explanatory view showing a front portion of the straddle-type vehicle according to the embodiment of the present invention while a cowl is transmitted.
Figure 3:
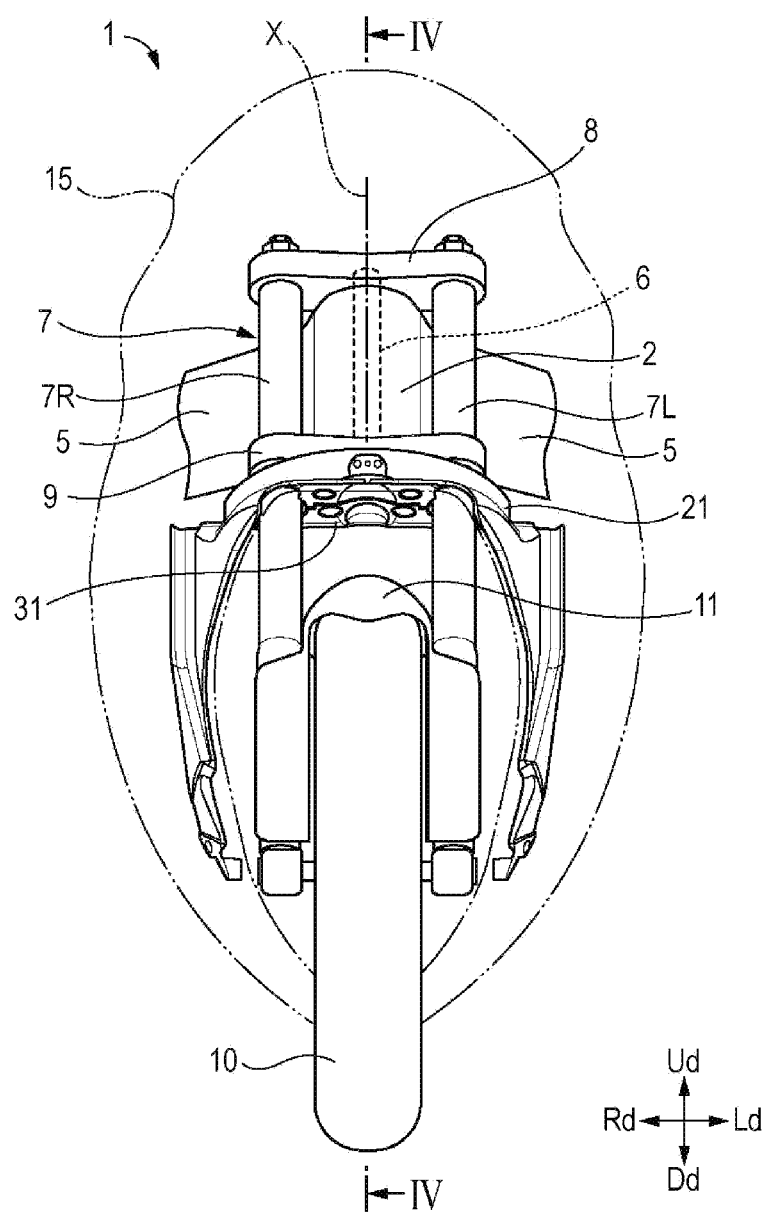
FIG. 3 is an explanatory view showing a state where the straddle-type vehicle according to the embodiment of the present invention is viewed from the front.
Figure 4:
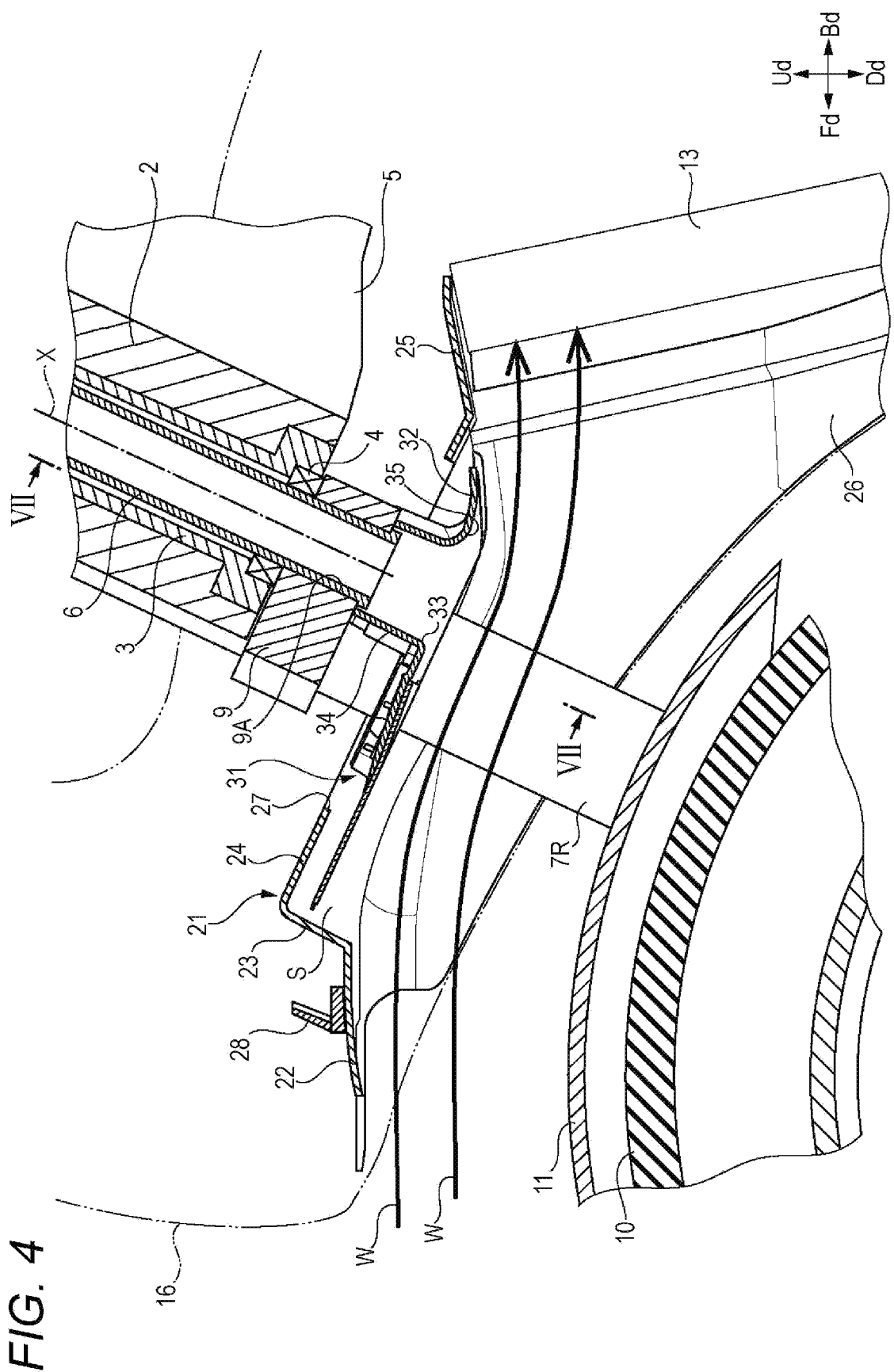
FIG. 4 is a cross-sectional view showing the front portion of the straddle-type vehicle according to the embodiment of the present invention cut along a cutting line IV-IV in FIG. 3.

FIG. 1 shows a state where a front portion of a straddle-type vehicle 1 according to the embodiment of the present invention is viewed from the left. FIG. 2 shows a front portion of the straddle-type vehicle 1 while a cowl 15 in FIG. 1 is transmitted. FIG. 3 shows a state where the straddle-type vehicle 1 in FIG. 2 is viewed from the front. FIG. 4 shows a state where a cross section of the front portion of the straddle-type vehicle 1 cut along a cutting line IV-IV in FIG. 3 is viewed from the left (the right in FIG. 3).

The straddle-type vehicle 1 is, for example, a motorcycle. As shown in FIGS. 2 and 3, the straddle-type vehicle 1 includes, as elements constituting a vehicle body frame forming a skeleton of the straddle-type vehicle 1, a head pipe 2 and a pair of left and right main frames 5 extending rearward from the head pipe 2. In the head pipe 2, a steering stem 6 which is a steering shaft is supported rotatably around an axis X thereof. Specifically, as shown in FIG. 4, the steering stem 6 is rotatably supported via a bearing 4 in an inner-cylinder 3 provided in the head pipe 2.

As shown in FIGS. 2 and 3, a front fork 7 that is a suspension connecting the vehicle body frame and a front wheel 10, an upper bracket 8 that connects an upper end portion of the front fork 7 to the steering stem 6, and a lower bracket 9 that is located below the upper bracket 8 and that connects an upper portion of the front fork 7 to the steering stem 6 are provided at a front portion of the straddle-type vehicle 1.

The upper bracket 8 extends in a left-right direction, and a steering stem attachment hole is formed in a center of the upper bracket 8. An upper end portion of the steering stem 6 extending upward from the head pipe 2 is inserted into and fixed to the steering stem attachment hole. A tube attachment portion is provided at each of a left end portion and a right end portion of the upper bracket 8, and an upper end portion of a left tube 7L of the front fork 7 is attached to the left tube attachment portion. An upper end portion of a right tube 7R of the front fork 7 is attached to the right tube attachment portion. The lower bracket 9 extends in the left-right direction, and a lower end portion of the steering stem 6 extending downward from the head pipe 2 is inserted into and fixed to a steering stem attachment hole 9A formed in a center of the lower bracket 9 (see FIG. 4). An upper portion of the left tube 7L of the front fork 7 is attached to a tube attachment portion provided at a left end portion of the lower bracket 9, and an upper portion of the right tube 7R of the front fork 7 is attached to a tube attachment portion provided at a right end portion of the lower bracket 9.

The front wheel 10 is rotatably supported at a lower end portion of the front fork 7. A front fender 11 that covers the front wheel 10 from above is provided at a lower portion of the front fork 7.

As shown in FIG. 2, in the straddle-type vehicle 1, a water-cooled engine 12, for example, is provided behind the front wheel 10, and a radiator 13 that cools, by traveling wind, cooling water for cooling the engine 12 and the like is provided between the front wheel 10 and the engine 12.

The straddle-type vehicle 1 includes the cowl 15. In the present embodiment, the cowl 15 is a so-called full cowl, and includes a front cowl portion 16, a pair of left and right side cowl portions 17, and an under cowl portion 18 as shown in FIG. 1. The front cowl portion 16 covers an upper front portion of the straddle-type vehicle 1. Specifically, the front cowl portion 16 is located above the front wheel 10, and covers a part from the front of the upper part of the front fork 7 to the left of a front portion of the left main frame 5, and a part from the front of the upper part of the front fork 7 to the right of a front portion of the right main frame 5. The front cowl portion 16 is a specific example of a "front cowl". The pair of side cowl portions 17 cover a left portion and a right portion of the straddle-type vehicle 1, specifically, the left and the right of the radiator 13 and the engine 12. The under cowl portion 18 covers a lower part of the engine 12. Although not shown, the cowl 15 is supported by the head pipe 2, the pair of main frames 5, and the like via stays or brackets.

Although not shown, a handlebar is attached to an upper portion of the upper bracket 8. When a driver operates the handlebar to steer the straddle-type vehicle 1, the steering stem 6, the upper bracket 8, the lower bracket 9, the front fork 7, the front wheel 10, and the front fender 11 rotate with respect to the head pipe 2 and the cowl 15 within a predetermined angle range about the axis X. A caster angle of the straddle-type vehicle 1 is, for example, approximately 25 degrees, and the head pipe 2, the steering stem 6, and the front fork 7 are each inclined at 25 degrees with respect to a vertical straight line such that a lower end portion thereof is located in front of an upper end portion thereof.

As shown in FIG. 4, the straddle-type vehicle 1 includes a shroud 21 that covers a lower portion of the front cowl portion 16, and a lower bracket cover 31 that covers the lower bracket 9 from below. The shroud 21 and the lower bracket cover 31 are located above a rear portion of the front fender 11. The shroud 21 is formed with an opening 27 through which the front fork 7 passes. The opening 27 corresponds to a space through which the front fork 7 passes. The opening 27 of the shroud 21 is located below the lower bracket 9. The lower bracket cover 31 is provided below the opening 27, and covers the entire opening 27 from below. The lower bracket cover 31 has a function of suppressing traveling wind passing through the opening 27 of the shroud 21 and entering an inside of the front cowl portion 16. Hereinafter, the shroud 21 and the lower bracket cover 31 will be described in detail.

(Shroud)

Figure 5A:
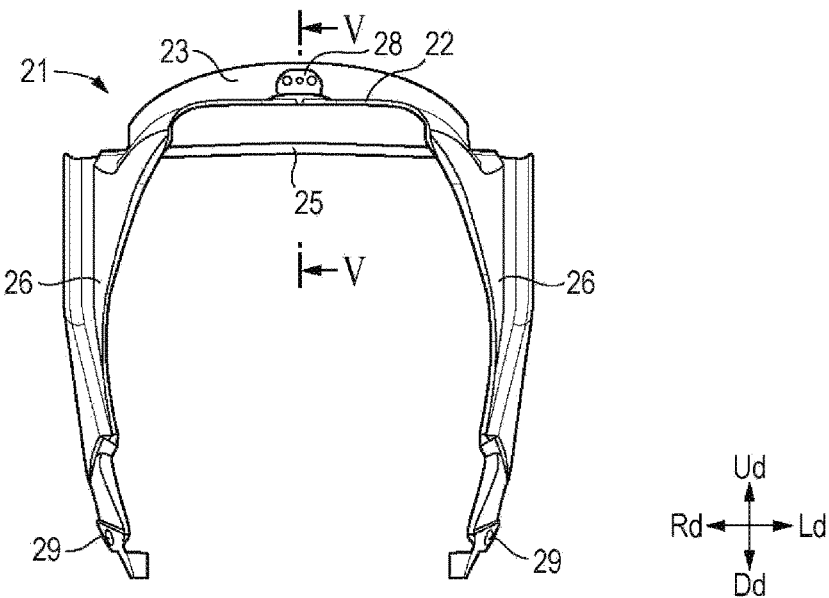
Figure 5B:
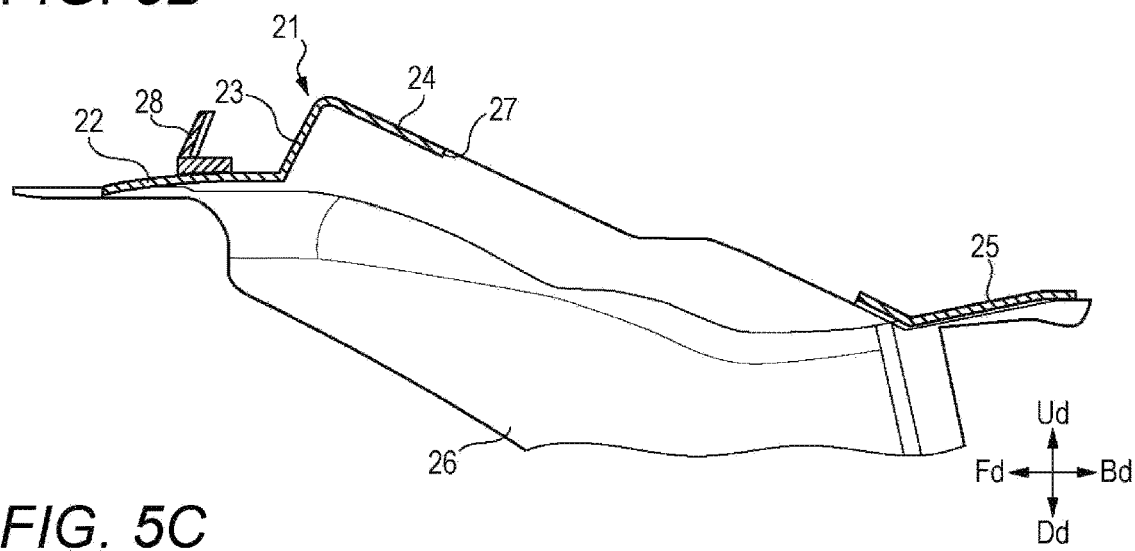
Figure 5C:
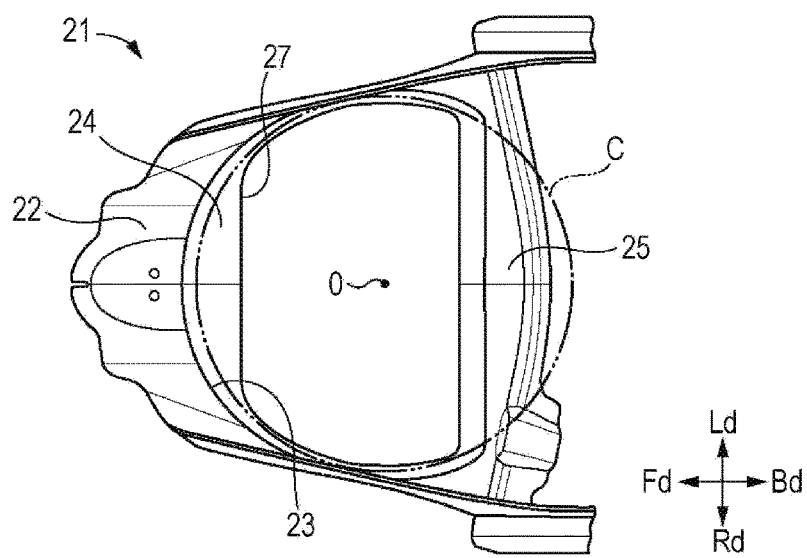

FIG. 5A shows a state where the shroud 21 is viewed from the front. FIG. 5B shows a state where a cross section of the shroud 21 cut along a cutting line V-V in FIG. 5A is viewed from the left (the right in FIG. 5A). FIG. 5C shows a state where the shroud 21 is viewed from below.

As shown in FIGS. 5A to 5C, the shroud 21 includes a front plate portion 22, a protruding plate portion 23, an upper plate portion 24, a rear plate portion 25, and a pair of left and right side plate portions 26. The front plate portion 22 extends rearward from a front end portion of the shroud 21 while gradually expanding to the left and the right. A lower surface of the front plate portion 22 is substantially horizontal.

The protruding plate portion 23 protrudes upward from a rear portion of the front plate portion 22. A rear surface of a front portion of the protruding plate portion 23 is inclined in a manner of being parallel to an extending direction of the front fork 7. A rear surface of the protruding plate portion 23 extends in the left-right direction while drawing an arc. Specifically, the rear surface of the protruding plate portion 23 is formed in an arc shape along a circle C (see FIG. 5C) about the axis X of the steering stem 6.

The upper plate portion 24 extends rearward from an upper portion of the protruding plate portion 23 while gradually expanding to the left and right. A lower surface of the upper plate portion 24 is inclined downward from a front end of the upper plate portion 24 toward the rear in a manner of being orthogonal to the extending direction of the front fork 7.

The rear plate portion 25 extends rearward from a rear portion of the upper plate portion 24. A lower surface of the rear plate portion 25 is inclined slightly upward from a front end of the rear plate portion 25 toward the rear in a manner of being parallel to an upper surface of the radiator 13. The rear plate portion 25 is located above the radiator 13 and is in contact with or extremely close to the upper surface of the radiator 13 (see FIG. 4).

The left side plate portion 26 is provided on a left portion of the shroud 21, and covers an inside of a part from a lower left portion of the front cowl portion 16 to a front portion of the left side cowl portion 17 in the cowl 15. The right side plate portion 26 is provided on a right portion of the shroud 21, and covers an inside of a part from a lower right portion of the front cowl portion 16 to a front portion of the right side cowl portion 17 in the cowl 15.

The shroud 21 has the opening 27 through which the front fork 7 passes. The opening 27 is formed in the upper plate portion 24. The opening 27 penetrates a substantially central portion of the upper plate portion 24 in the upper-lower direction. The opening 27 is located below the lower bracket 9. As shown in FIG. 4, a pair of tubes 7L, 7R of the front fork 7 penetrate the opening 27. A position and an opening area of the opening 27 are set such that the front fork 7 does not come into contact with the shroud 21 (an edge of the opening 27) when the driver operates the handlebar to steer the straddle-type vehicle 1 and thereby the front fork 7 rotates.

The front plate portion 22 of the shroud 21 is provided with a fixing portion 28 that fixes the shroud 21 to the cowl 15. Each side plate portion 26 of the shroud 21 is provided with a fixing portion 29 that fixes the shroud 21 to the cowl 15. The shroud 21 is fixed to the cowl 15 by attaching the fixing portions 28, 29 to the cowl 15 using, for example, a fixing member such as a rivet or a screw.

(Lower Bracket Cover)

Figure 6A:
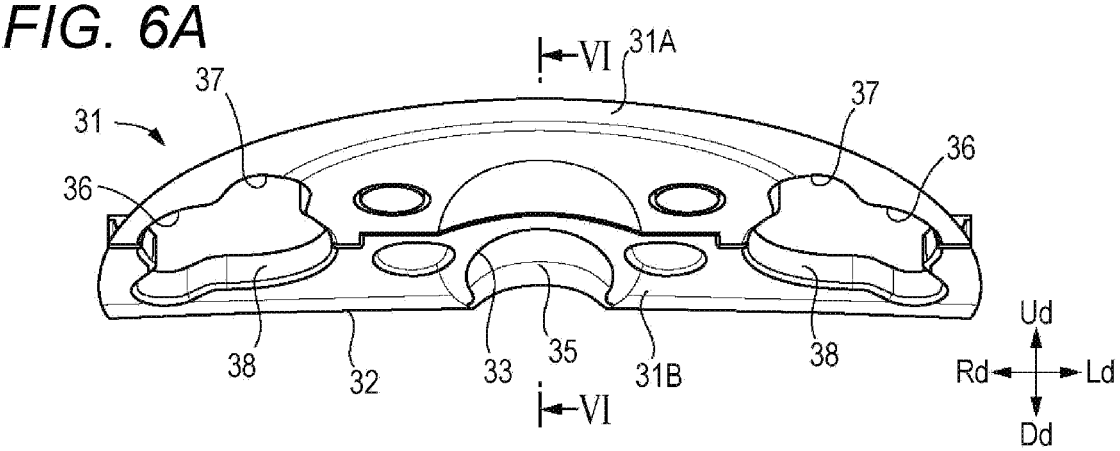
Figure 6B:
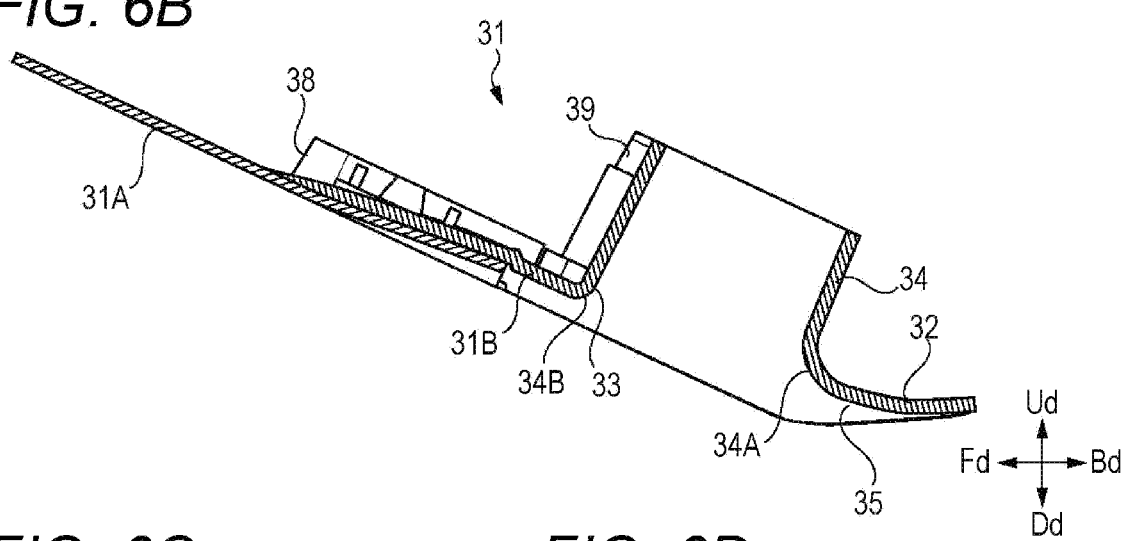
Figure 6C:
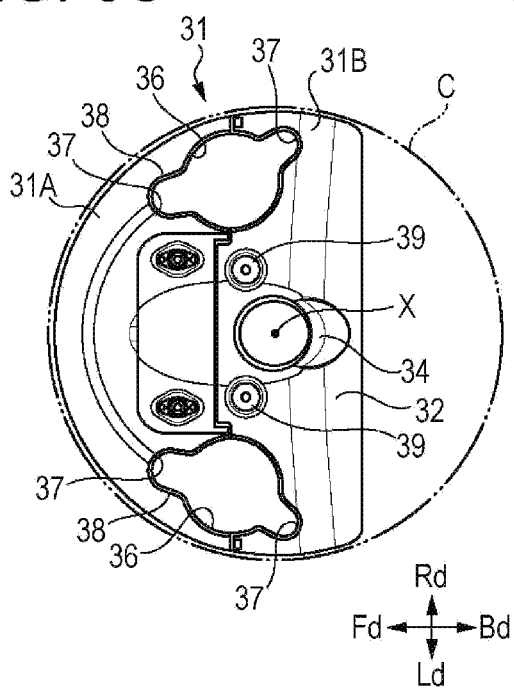
Figure 6D:
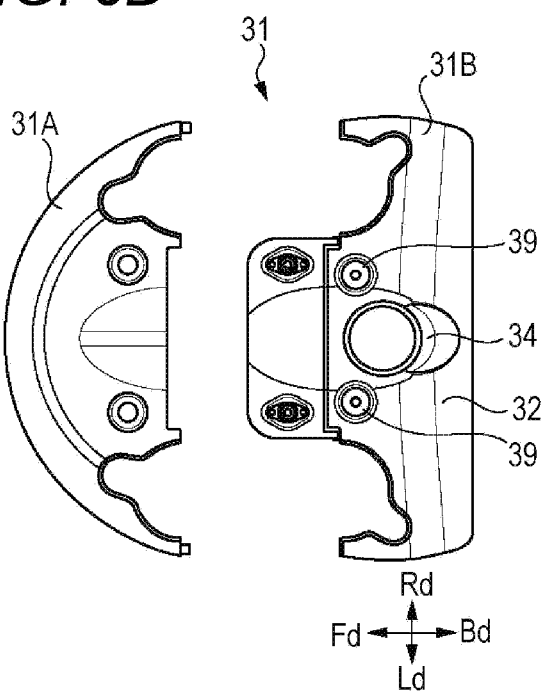
Figure 7:
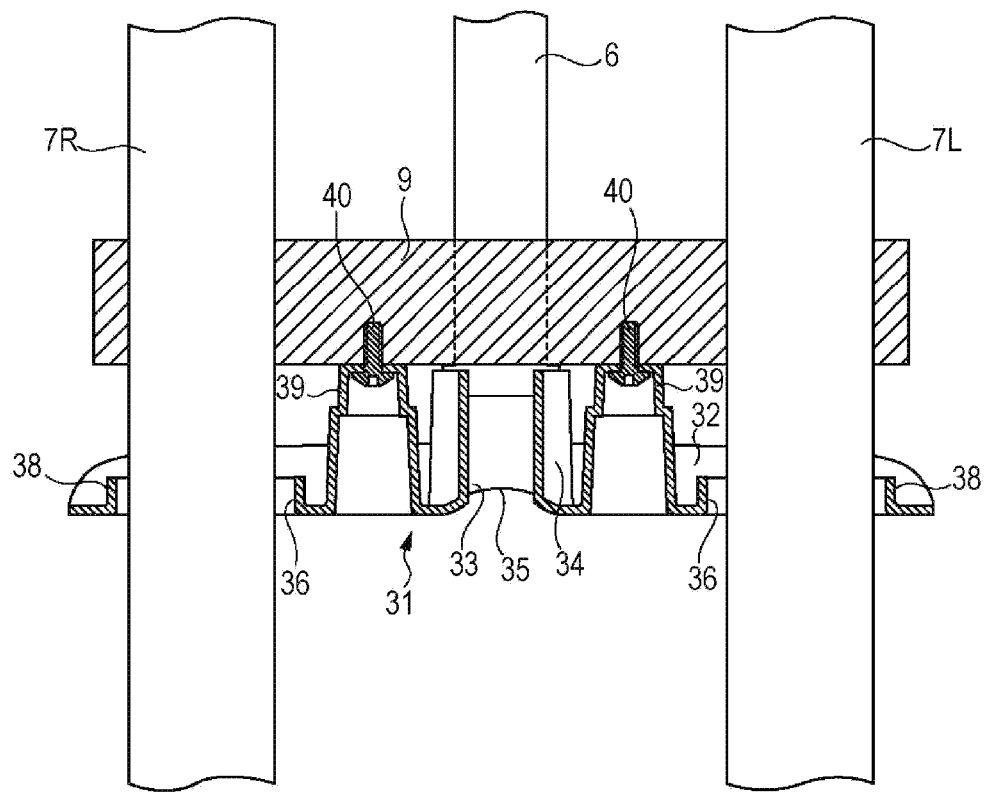
FIG. 7 shows a state where a cross section of a lower bracket and the lower bracket cover cut along a cutting line VII-VII in FIG. 4 is viewed from the front.

FIG. 6A shows a state where the lower bracket cover 31 is viewed from the front. FIG. 6B shows a state where a cross section of the lower bracket cover 31 cut along a cutting line VI-VI in FIG. 6A is viewed from the left (the right in FIG. 6A). FIG. 6C shows a state where the lower bracket cover 31 is viewed from above. FIG. 6D shows a state where the disassembled lower bracket cover 31 is viewed from above. FIG. 7 shows a state where a cross section of the lower bracket 9 and the lower bracket cover 31 cut along a cutting line VII-VII in FIG. 4 is viewed from the front (more accurately, a direction orthogonal to the extending direction of the front fork 7).

As shown in FIGS. 6A to 6C, the lower bracket cover 31 is formed in a circular plate shape (a chipped circular plate shape) in which a rear end side part is chipped. Further, a front edge of the lower bracket cover 31 is formed in an arc shape along the circle C (see FIG. 6C) about the axis X of the steering stem 6. A radius of an arc of the front edge of the lower bracket cover 31 is smaller than a radius of an arc of the rear surface of the protruding plate portion 23 of the shroud 21.

A lower surface of a front portion of the lower bracket cover 31 is flat as a whole. A bent portion 32 is formed at a rear portion of the lower bracket cover 31. A lower surface of the bent portion 32 is bent upward with respect to the lower surface of the front portion of the lower bracket cover 31.

A through hole 33 is formed in a central portion of the lower bracket cover 31. The through hole 33 is a hole for attaching a stand for floating the front wheel 10 from the ground for maintenance of the straddle-type vehicle 1 or the like. A cylindrical portion 34 extending upward from a peripheral edge portion of the through hole 33 is formed at the peripheral edge portion of the through hole 33. A recess 35 recessed upward is formed in a rear part of the through hole 33 in the lower surface of the lower bracket cover 31. An inside of the recess 35 communicates with an inside of the cylindrical portion 34. A boundary part between the opening (that is, the through hole 33) on a lower side of the cylindrical portion 34 and the recess 35 is gently curved as shown in FIG. 6B. As a result, a radius of curvature of a corner portion 34A on a rear side of the opening on the lower side of the cylindrical portion 34 is larger than a radius of curvature of a corner portion 34B on a front side of the opening.

Two tube insertion holes 36 through which the pair of tubes 7L, 7R of the front fork 7 are inserted are formed in a left portion and a right portion of the lower bracket cover 31, respectively. The tube insertion hole 36 is formed for each tube of the front fork 7. The two tube insertion holes 36 are separated from each other and are independent of each other. On an outer peripheral side of each of the tube insertion holes 36, a component insertion hole 37 through which, for example, a brake hose, a cable, or the like is inserted is formed integrally with the tube insertion hole 36. Further, at a peripheral edge portion of the tube insertion hole 36 and the component insertion hole 37, an edge wall 38 protruding upward is provided over an entire circumference of the peripheral edge portion of the tube insertion hole 36 and the component insertion hole 37.

Attachment portions 39 configured to attach the lower bracket cover 31 to the lower bracket 9 are provided at the left portion and the right portion of the lower bracket cover 31, specifically, between the cylindrical portion 34 and the left tube insertion hole 36, and between the cylindrical portion 34 and the right tube insertion hole 36 in the lower bracket cover 31. Each attachment portion 39 protrudes upward from the upper surface of the lower bracket cover 31. As shown in FIG. 7, each attachment portion 39 is formed in a shape of a covered cylinder. A hole, through which a fixing member 40 such as a screw passes, is formed in an upper surface of each attachment portion 39. The lower bracket cover 31 is attached to the lower bracket 9 by fixing an upper end portion of each attachment portion 39 to a lower surface of the lower bracket 9 using the fixing member 40.

As shown in FIG. 6D, the lower bracket cover 31 is formed by coupling a front cover piece 31A and a rear cover piece 31B using a fixing member such as a rivet or a screw.

As shown in FIG. 4, the lower bracket cover 31 is provided below the opening 27 of the shroud 21. The lower bracket cover 31 covers the entire opening 27 from below the opening 27. The lower bracket cover 31 covers the lower bracket 9 located above the opening 27 from below.

The lower bracket cover 31 is inclined such that an extending direction of the lower surface of the front portion of the lower bracket cover 31 in a front-rear direction is orthogonal to the extending direction of the front fork 7. As a result, the lower surface of the front portion of the lower bracket cover 31 is inclined downward from a front end portion thereof toward the rear. In a state where the lower surface of the front portion of the lower bracket cover 31 is inclined as described above, the lower surface of the bent portion 32 formed at the rear portion of the lower bracket cover 31 is slightly inclined upward from a front end portion of the lower surface toward the rear. The front portion of the lower bracket cover 31 is parallel to the upper plate portion 24 of the shroud 21 and is close to the upper plate portion 24.

The lower bracket cover 31 is provided behind the protruding plate portion 23 of the shroud 21. A front end of the lower bracket cover 31 faces the rear surface of the protruding plate portion 23. A front end portion of the lower bracket cover 31 is provided at a position higher than the lower surface of the front plate portion 22 of the shroud 21 and lower than a lower surface of a front end portion of the upper plate portion 24 of the shroud 21. A lower surface of a rear end portion of the lower bracket cover 31 is located substantially in the same plane as the lower surface of the rear plate portion 25 of the shroud 21.

Figure 8A:
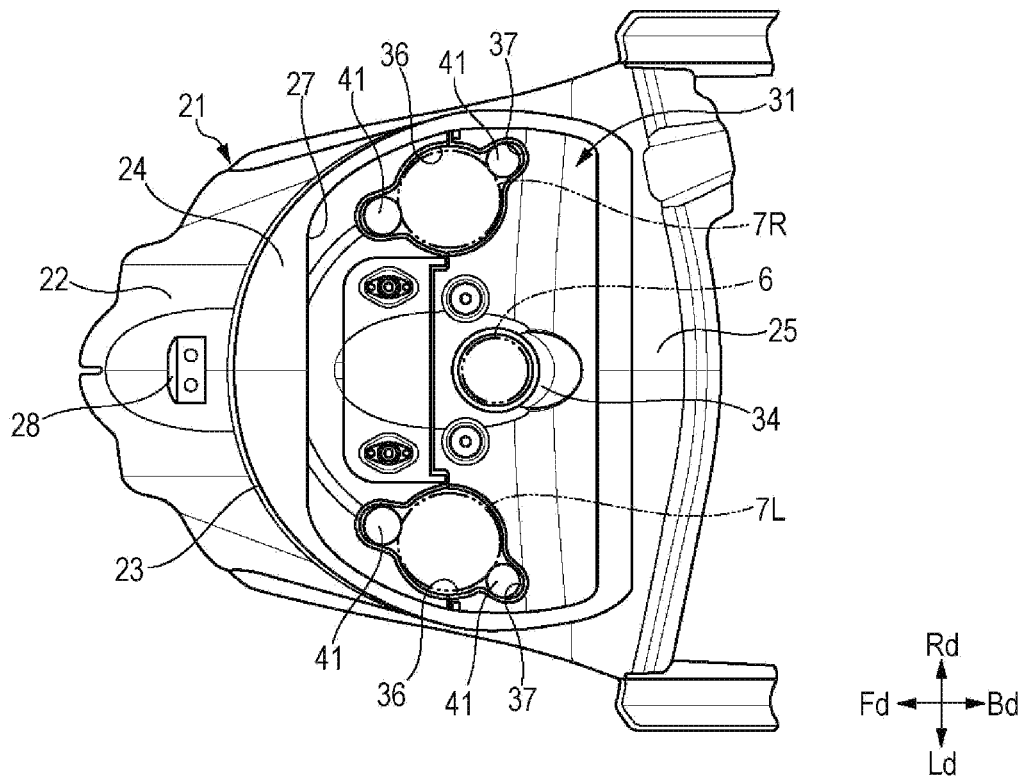
Figure 8B:
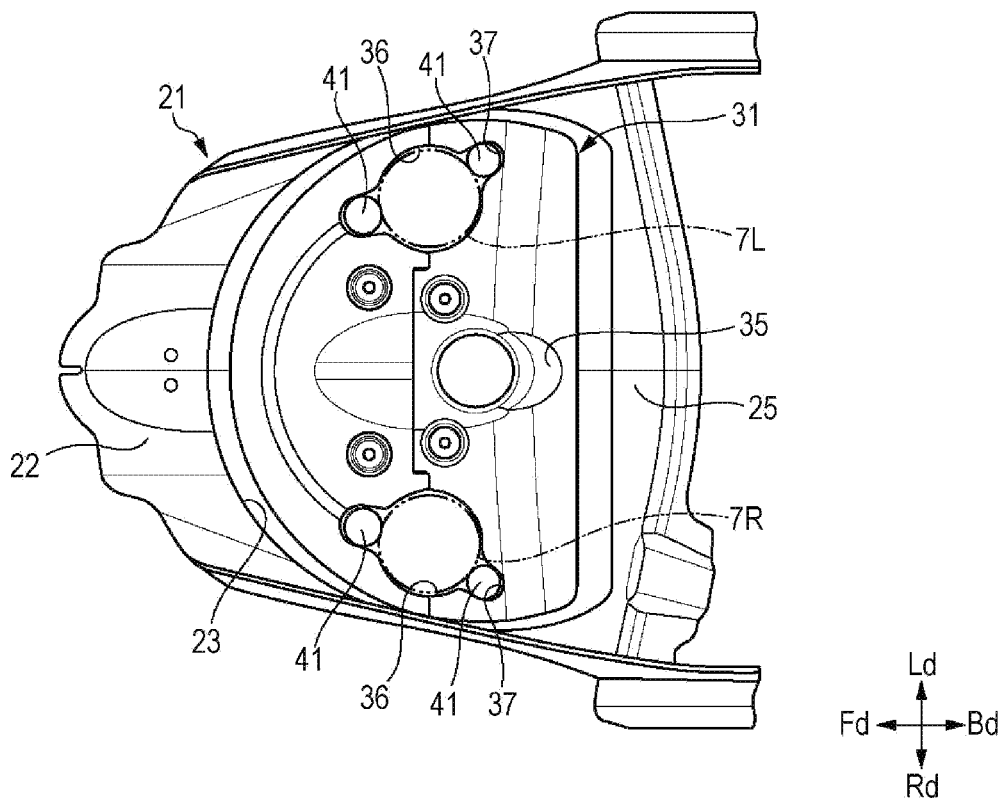

FIG. 8A shows a state where the shroud 21 and the lower bracket cover 31 are viewed from above. As can be seen from FIG. 8A, the lower bracket cover 31 is located below the opening 27 of the shroud 21. An outer peripheral side part of the lower bracket cover 31 overlaps with a peripheral edge part of the opening 27 in the upper plate portion 24 of the shroud 21 over an entire circumference. FIG. 8B illustrates a state where the shroud 21 and the lower bracket cover 31 are viewed from below. As can be seen from FIG.

8B, the lower bracket cover 31 covers the entire opening 27 of the shroud 21 from below.

The lower bracket cover 31 is fixed to the lower bracket 9 as described above, the lower bracket cover 31 is not in contact with the shroud 21, a center of the arc of the front edge of the lower bracket cover 31 and a center of the arc of the rear surface of the protruding plate portion 23 of the shroud 21 are both located on the axis X of the steering stem 6, and the radius of the arc of the front edge of the lower bracket cover 31 is smaller than the radius of the arc of the rear surface of the protruding plate portion 23 of the shroud 21. According to this configuration, when the driver operates the handlebar to steer the straddle-type vehicle 1, the lower bracket cover 31 rotates about the axis X relative to the shroud 21.

In the lower bracket cover 31, the through hole 33 is located below the steering stem 6, and the cylindrical portion 34 extends toward the steering stem 6. As shown in FIG. 4, the lower end portion (that is, a part of the steering stem 6 protruding downward from the steering stem attachment hole 9A of the lower bracket 9) of the steering stem 6 is inserted into the cylindrical portion 34 from above. Accordingly, an upper opening of the cylindrical portion 34 is closed by the lower end portion of the steering stem 6.

As shown in FIG. 7, each of the tubes 7L, 7R of the front fork 7 is inserted into a respective one of the two tube insertion holes 36. A brake hose, a cable, or the like is provided in the component insertion hole 37. However, when it is not necessary to provide a brake hose, a cable, or the like in the component insertion hole 37, as shown in FIG. 8A, a sponge 41 is mounted in the component insertion hole 37.

In the straddle-type vehicle 1 according to the present embodiment having the above configuration, as shown in FIG. 4, the lower bracket cover 31 covers the entire opening 27 of the shroud 21 from below. Accordingly, traveling wind W passing between the shroud 21 and the front fender 11 during traveling of the straddle-type vehicle 1 can be suppressed from entering the inside of the front cowl portion 16 through the opening 27 of the shroud 21. Therefore, it is possible to suppress an increase in air resistance or generation of a front lift caused by the traveling wind W entering the inside of the front cowl portion 16 through the opening 27, and thus it is possible to improve an aerodynamic performance of the straddle-type vehicle 1. According to the straddle-type vehicle 1, a high aerodynamic performance required for a racing vehicle can be achieved. Further, it is possible to increase an amount of the traveling wind W blowing against the radiator 13, and it is possible to improve a cooling effect for the radiator 13.

In the straddle-type vehicle 1 according to the present embodiment, the front end portion of the lower bracket cover 31 is located above the front plate portion 22 of the shroud 21 and faces the rear surface of the protruding plate portion 23. That is, the front end portion of the lower bracket cover 31 is located in a space S (see FIG. 4) surrounded by the protruding plate portion 23 and the upper plate portion 24 of the shroud 21. Accordingly, the traveling wind W passes under the lower bracket cover 31 and smoothly flows toward the radiator 13. Therefore, it is possible to suppress the traveling wind W from passing between the front end portion of the lower bracket cover 31 and the shroud 21 toward the opening 27, and it is possible to suppress the traveling wind W from entering the inside of the front cowl portion 16 through the opening 27.

Further, in the straddle-type vehicle 1 according to the present embodiment, the front edge of the lower bracket cover 31 and the rear surface of the protruding plate portion 23 of the shroud 21 are formed in concentric arc shapes. Therefore, the front edge of the lower bracket cover 31 and the rear surface of the protruding plate portion 23 of the shroud 21 are close to each other over a wide range in a circumferential direction. Accordingly, a gap between the front edge of the lower bracket cover 31 and the rear surface of the protruding plate portion 23 can be reduced. Therefore, it is possible to suppress the traveling wind W from passing between the front end portion of the lower bracket cover 31 and the rear surface of the protruding plate portion 23 toward the opening 27, and it is possible to suppress the traveling wind W from entering the inside of the front cowl portion 16 through the opening 27.

In the lower bracket cover 31, the tube insertion hole 36 is formed for each tube of the front fork 7. That is, the lower bracket cover 31 is not formed with one large hole through which the two tubes 7L, 7R of the front fork 7 collectively pass, but is formed with two small holes through which the two tubes 7L, 7R of the front fork 7 individually pass. Accordingly, a gap between the left tube insertion hole 36 and an outer peripheral surface of the tube 7L and a gap between the right tube insertion hole 36 and an outer peripheral surface of the tube 7R can be reduced. Therefore, it is possible to suppress the traveling wind W from blowing toward the opening 27 through the tube insertion hole 36, and it is possible to suppress the traveling wind W from entering the inside of the front cowl portion 16 through the opening 27.

When it is not necessary to provide a brake hose, a cable, or the like in the component insertion hole 37 of the lower bracket cover 31, the component insertion hole 37 is filled with the sponge 41 and is closed. Accordingly, it is possible to suppress the traveling wind W from blowing toward the opening 27 through the component insertion hole 37, and it is possible to suppress the traveling wind W from entering the inside of the front cowl portion 16 through the opening 27.

The lower surface of the front portion of the lower bracket cover 31 is inclined downward from the front end portion of the lower surface toward the rear, the lower surface of the bent portion 32 formed at the rear portion of the lower bracket cover 31 is gently curved upward, and a lower surface of a rear end portion of the bent portion 32 is slightly inclined upward toward the rear. The rear end portion of the lower bracket cover 31 is located substantially in the same plane as the rear plate portion 25 of the shroud 21. Accordingly, a continuous surface having less unevenness is formed from the lower surface of the front portion of the lower bracket cover 31 to the lower surface of the rear plate portion 25 of the shroud 21. According to this configuration, the traveling wind W can be smoothly guided to the radiator 13, and the amount of the traveling wind W blowing against the radiator 13 can be increased.

The cylindrical portion 34 extending from the peripheral edge portion of the through hole 33 of the lower bracket cover 31 to the lower end portion of the steering stem 6 is provided at the peripheral edge portion of the through hole 33. Further, the upper opening of the cylindrical portion 34 is closed by the lower end portion of the steering stem 6 entering the opening. According to this configuration, it is possible to suppress the traveling wind W from entering the inside of the front cowl portion 16 through the through hole 33 of the lower bracket cover 31.

The recess 35 recessed upward is formed in a rear part of the through hole 33 in the lower surface of the lower bracket cover 31, and the inside of the recess 35 communicates with the inside of the cylindrical portion 34. Accordingly, it is possible to suppress the traveling wind W from flowing into the cylindrical portion 34 through the through hole 33 of the lower bracket cover 31, and it is possible to reduce air resistance formed by the lower bracket cover 31.

In the straddle-type vehicle 1 according to the present embodiment, the lower bracket cover 31 is provided below the upper plate portion 24 and the opening 27 of the shroud 21. Therefore, even when a distance between the lower bracket 9 and the shroud 21 in the upper-lower direction is increased due to design of the straddle-type vehicle 1, a vehicle setting during racing, or the like, the lower bracket cover 31 can be provided below the upper plate portion 24 and the opening 27 of the shroud 21 in a state of being close to the upper plate portion 24 and the opening 27, and the opening 27 can be reliably covered by the lower bracket cover 31. Therefore, an effect of the lower bracket cover 31 of suppressing the traveling wind W from entering the inside of the front cowl portion 16 through the opening 27 can be suppressed from being lowered due to an increase in the distance between the lower bracket 9 and the shroud 21 in the upper-lower direction due to the design of the straddle-type vehicle 1 or the like. When the distance between the lower bracket 9 and the shroud 21 in the upper-lower direction is increased due to the design of the straddle-type vehicle 1 or the like, a position of the lower bracket cover 31 can be easily lowered by providing a spacer between the lower surface of the lower bracket 9 and the upper surface of each attachment portion 39 of the lower bracket cover 31.

Since the lower bracket cover 31 is provided below the upper plate portion 24 and the opening 27 of the shroud 21, even when the distance between the lower bracket 9 and the shroud 21 in the upper-lower direction is extremely small due to the design of the straddle-type vehicle 1 or the like, the lower bracket cover 31 can be provided below the opening 27, and the opening 27 can be covered by the lower bracket cover 31.

The front fork 7 of the straddle-type vehicle 1 according to the above-described embodiment is of an inverted type. However, the present invention can also be applied to a straddle-type vehicle including a front fork of an upright type. In the straddle-type vehicle 1 according to the above-described embodiment, the radiator 13 is provided behind the front wheel 10, and the traveling wind W is guided to the radiator 13. However, an oil cooler may be provided behind the front wheel 10, and the traveling wind W may be guided to the oil cooler. When the engine of the straddle-type vehicle is an air-cooled engine, the traveling wind W may be guided to the air-cooled engine provided behind the front wheel 10. In the present invention, a type of the cowl of the straddle-type vehicle is not limited. The straddle-type vehicle according to the present invention is not limited to a motorcycle, but may be another type of straddle-type vehicle. Further, the straddle-type vehicle according to the present invention is not limited to a racing vehicle.

The present invention can be modified as appropriate without departing from the spirit or concept of the invention that can be read from the claims and the entire description, and the straddle-type vehicle accompanying such a modification is also included in the technical concept of the present invention.

What is claimed is:

1. A straddle-type vehicle comprising:
a head pipe;
a steering stem rotatably supported in the head pipe;
a front fork;
an upper bracket connecting an upper end portion of the front fork to the steering stem;
a lower bracket located below the upper bracket and connecting an upper portion of the front fork to the steering stem;
a front wheel supported by a lower end portion of the front fork;
a front fender covering the front wheel from above;
a front cowl covering an upper front portion of the straddle-type vehicle;
a shroud located above the front fender and covering a lower portion of the front cowl; and
a lower bracket cover located above the front fender and covering the lower bracket from below,
wherein the shroud has an opening through which the front fork passes, and
wherein the lower bracket cover is provided below the opening.

2. The straddle-type vehicle according to claim 1,
wherein the shroud includes a front plate portion extending rearward from a front end portion of the shroud, a protruding plate portion protruding upward from a rear portion of the front plate portion, and an upper plate portion extending rearward from an upper portion of the protruding plate portion,
wherein the opening is formed in the upper plate portion, and
wherein the lower bracket cover is provided behind the protruding plate portion and below the opening.

3. The straddle-type vehicle according to claim 2,
wherein a front edge of the lower bracket cover and a rear surface of the protruding plate portion are each formed in an arc shape along a circle centered on an axis of the steering stem.

4. The straddle-type vehicle according to claim 1,
wherein a lower surface of a front portion of the lower bracket cover is inclined downward from a front end portion of the lower surface toward rear, and
wherein a lower surface of a rear portion of the lower bracket cover is bent upward with respect to the lower surface of the front portion of the lower bracket cover.

5. The straddle-type vehicle according to claim 1,
wherein a through hole is formed in a part of the lower bracket cover located below the steering stem,
wherein a cylindrical portion extending from a peripheral edge portion of the through hole toward the steering stem is provided at the peripheral edge portion of the through hole, and
wherein a recess recessed upward and communicating with an inside of the cylindrical portion is formed at a rear part of the through hole in a lower surface of the lower bracket cover.

6. The straddle-type vehicle according to claim 1,
wherein two tube insertion holes are formed in the lower bracket cover, each of a pair of tubes of the front fork passing through each of the two tube insertion holes, and
wherein the two tube insertion holes are separated from each other and independent of each other.

* * * * *